United States Patent
Kumar et al.

(10) Patent No.: US 9,716,517 B1
(45) Date of Patent: Jul. 25, 2017

(54) INTRINSICALLY SAFE TELEMATIC SYSTEMS

(71) Applicant: Fleetilla, LLC, Ann Arbor, MI (US)

(72) Inventors: Pradeep P. Kumar, Superior Township, MI (US); Mario L. Rocca, Brownstown, MI (US); Todd A. Theisen, Grosse Ile, MI (US); Pritesh R. Patel, Troy, MI (US)

(73) Assignee: Fleetilla, LLC, Ann Arbor, MI (US)

( * ) Notice: Subject to any disclaimer, the term of this patent is extended or adjusted under 35 U.S.C. 154(b) by 0 days.

(21) Appl. No.: 15/135,909

(22) Filed: Apr. 22, 2016

Related U.S. Application Data

(60) Provisional application No. 62/150,996, filed on Apr. 22, 2015.

(51) Int. Cl.
 *H04B 1/04* (2006.01)
 *H04B 1/03* (2006.01)
 *H02H 3/38* (2006.01)

(52) U.S. Cl.
 CPC ............... *H04B 1/03* (2013.01); *H02H 3/38* (2013.01); *H04B 1/04* (2013.01)

(58) Field of Classification Search
 CPC ... H04B 1/03; H04B 1/04; H04B 7/24; H04B 15/00; G01C 21/26; G01C 21/3688; G08B 13/1427; G08B 21/0219; G08B 21/0255; G08B 21/0275; G07C 9/00111; G07C 9/00103; G06K 19/07762; G06K 19/0711; G06K 19/071; G06K 7/10237
 See application file for complete search history.

(56) References Cited

U.S. PATENT DOCUMENTS

| | | | |
|---|---|---|---|
| 7,904,219 B1 * | 3/2011 | Lowrey et al. .... | G01C 21/3688 701/32.3 |
| 2014/0240088 A1 * | 8/2014 | Robinette et al. . | G08B 13/1427 340/5.61 |
| 2015/0120083 A1 * | 4/2015 | Gurovich et al. ..... | G07C 5/008 701/1 |

OTHER PUBLICATIONS

Linear Technology Corporation, LT4356-1/LT4356-2 Surge Stopper, pp. 1-26, Milpitas, California.

* cited by examiner

*Primary Examiner* — Thanh Le
(74) *Attorney, Agent, or Firm* — Young Basile Hanlon & MacFarlane, P.C.

(57) ABSTRACT

A telematics system includes a telematics input unit that has a first housing and an electrical barrier located in the telematics input unit. The telematics input unit is connectable to a power supply through the electrical barrier and provides safe electrical power. A telematics transmitter unit has a second housing and is remote from the telematics input unit. The telematics transmitter unit receives the safe electrical power from the telematics input unit. A communications device is disposed within the telematics transmitter unit.

10 Claims, 6 Drawing Sheets

INTRINSICALLY SAFE TELEMATIC SYSTEMS

CROSS-REFERENCE TO RELATED APPLICATIONS

This application claims the benefit of U.S. Provisional Patent Application Ser. No. 62/150,996, which was filed on Apr. 22, 2015.

TECHNICAL FIELD

This disclosure relates generally to safe installation and use of electrical telematics systems components in vehicles and other mobile assets so that they can be operated in hazardous environments.

BACKGROUND

The field of telematics encompasses telecommunications, vehicle technology, on-road transportation, off-road transportation, and transportation safety. Telematics systems are applied to real time tracking of mobile assets such as motor vehicles, trailers, and shipping containers, and can be used to track a small number of mobile assets or an entire fleet of mobile assets. Technologies such as a satellite positioning system (e.g. GPS) allow the position of a mobile asset to be determined. Technologies such as wireless communication over wide area networks such as cellular telephone systems allow position information and other information to be relayed to a location that is remote relative to the mobile asset. Thus, it is feasible to monitor the location, movement, status and performance of mobile assets anywhere in the world.

Electronic components attached to vehicular or other assets often include a satellite transponder, global positioning system receiver, cellular modem, one or more sensors or transducers, a data storage device and a central computer or micro controller. These components are typically wired into fleet assets so that the location, usage and status of these assets can be remotely monitored. Collectively, these components gather position information from the GPS receiver, obtain input from multiple sensors or transducers regarding the condition of the asset, selectively store all or part of this data, and transmit selected data over the wireless network to a central dispatch location.

Certain environments present potential dangers to the use of electronic equipment, including electronic equipment associated with telematics systems. For example, refineries, chemical plants, mines and similar environments may present danger associated with potentially explosive mixtures of gases, liquids, aerosols, or particulate matter. Any electronic equipment used in these environments typically requires special attention to ensure that such equipment does not trigger an accidental explosion while operating, or under fault conditions. The technique of Intrinsic Safety has developed a recognized set of protection techniques for the safe operation of electrical equipment in hazardous areas by limiting the electrical energy available for ignition, i.e., preventing the formation of sparks or arcs. In essence, it is critical to ensure that electrical equipment does not adversely affect the safety of the environment in which it is used and that the equipment meets established safety standards and ratings, such as those published and endorsed by Underwriters Laboratory. The key operating principle in such system designs is to ensure that voltage and current levels present in the equipment remain within prescribed ranges.

SUMMARY

A telematics system includes a telematics input unit that has a first housing, and an electrical barrier located in the telematics input unit. The telematics input unit is connectable to a power supply through the electrical barrier, and provides safe electrical power. A telematics transmitter unit has a second housing and is remote from the telematics input unit. The telematics transmitter unit receives the safe electrical power from the telematics input unit. A communications device disposed within the telematics transmitter unit.

A telematics system includes a telematics input unit that has a first housing, and an electrical barrier located in the telematics input unit. A telematics transmitter unit has a second housing and is remote from the telematics input unit. A short range communications system allows transmission of information between the telematics input unit and the telematics transmitter unit. A long range communications device is disposed within the telematics transmitter unit.

BRIEF DESCRIPTION OF THE DRAWINGS

The description herein makes reference to the accompanying drawings wherein like reference numerals refer to like parts throughout the several views, and wherein.

DETAILED DESCRIPTION

Telematics systems require a reasonably unobstructed view of the sky in order to allow operation of satellite positioning systems and cellular or satellite communications systems. Because of this, these systems typically need to be installed with fairly long power connections (e.g., 10 to 15 feet) measured in distance from the power supply sources available in a vehicle or a mobile asset. Traditionally, operating voltages for this type of equipment have been in the range of 10 volts to 33 volts to provide adequate power for the cellular or satellite communications systems and also to be generally compatible with the sources of power available in the mobile equipment. In addition, since many assets need to be tracked at all times irrespective of their operational status, telematics systems are wired into assets such that they operate continuously, even when the asset is powered down.

Figure 1:
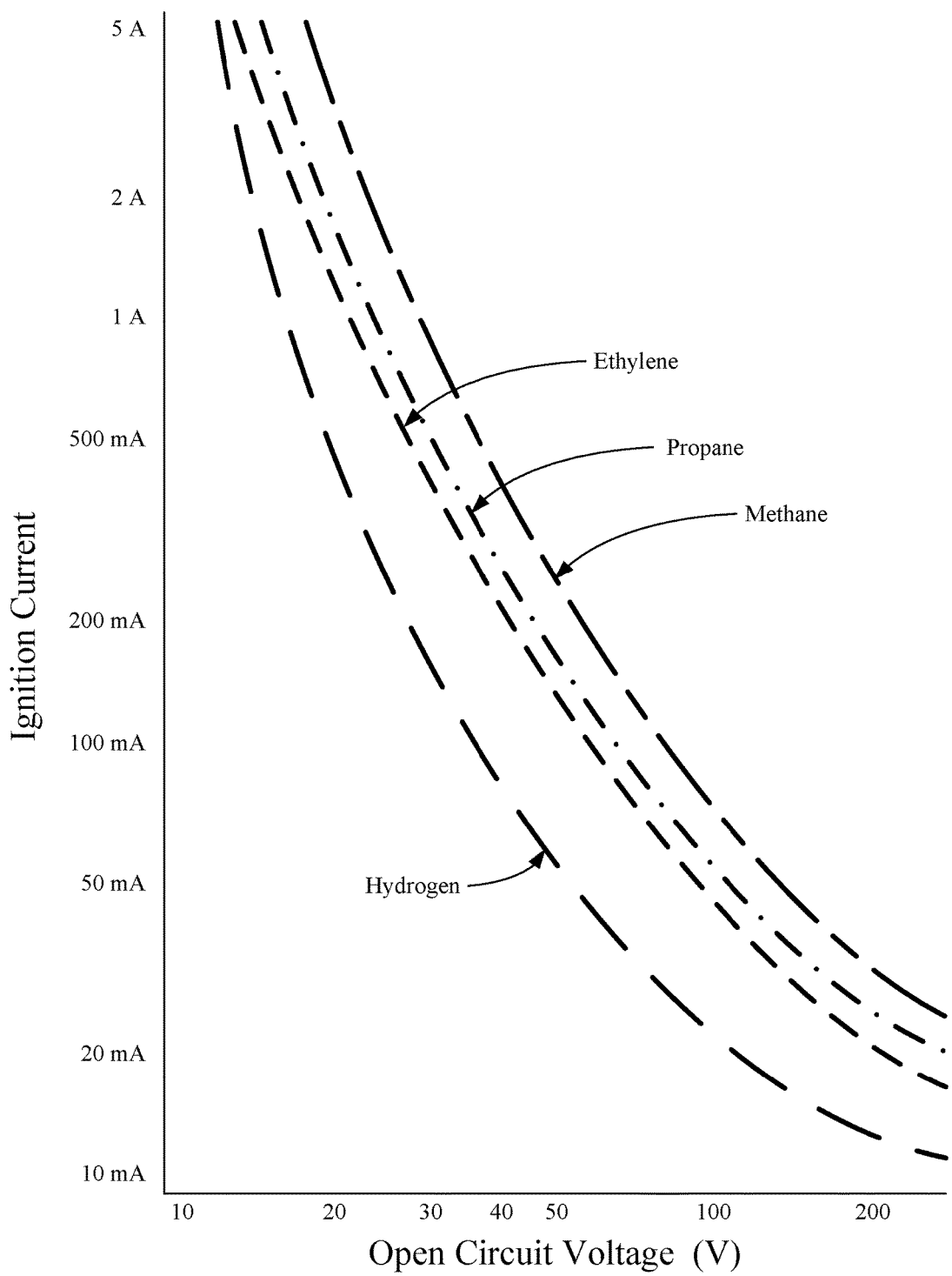
FIG. 1 is a graph depicting permissible voltage and current limits in a variety of different environments.

Mobile assets are capable of operating in a wide range of environments, including hazardous environments such as ones where the mobile asset is exposed to explosive mixtures of gases, liquids, vapors and particulate matter. In a hazardous environment, the voltage and current draw of a telematics system may pose a risk of triggering combustion, thus limiting the applicability of some telematics systems in hazardous environments. One known method for preventing combustion as a result of electrical discharge is to limit the voltage and current available on equipment that operates in the environment. As an example, FIG. 1 shows a risk of combustion in environments rich in hazardous gases such as methane, propane, ethylene, and hydrogen. Voltage and current combinations falling to the right of each line pose a risk of combustion when exposed to the gas associated with the line. Thus, a risk of combustion due to electrical discharge exists in a methane-rich environment for voltage and current combinations that are above and to the right of the methane line, which shows that the current should be limited to 5 amperes for voltages above 15 volts in a methane-rich environment.

Figure 2:
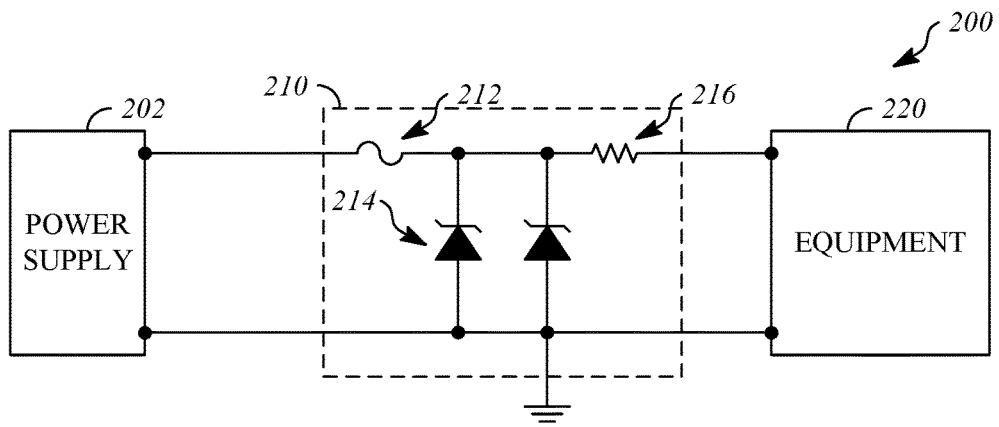
FIG. 2 is a block diagram showing an electrical barrier circuit according to a first example.

To address this problem, the telematics systems described herein incorporate an electrical barrier circuit to prevent excessive voltages and currents from existing within portions of the system that may be exposed to hazardous environments. FIG. 2 shows a circuit 200 in which an electrical barrier 210 according to a first example is positioned between a power supply 202 of the mobile asset and equipment 220 that is located in a hazardous environment. The electrical barrier 210 is designed to limit the voltage and current that is transmitted from the power supply 202 to subsequent components of the system, thereby allowing those subsequent components of the system to be exposed to hazardous environment. Here, input voltages are received from the power supply 202 at a fuse 212. Voltages through the electrical barrier are limited by a pair of Zener diodes 214, which, by their inherent qualities, begin conducting to a ground when the voltage across them exceeds a certain preset maximum. Within the same circuit, a current-limiting resistor 216 is mounted to limit the maximum current available in the circuit. By choosing the operating values of the Zener diodes 214 and the resistor with an adequate factor of safety, the maximum voltage-current combination with that system will pass falls below the published ignition curves such as those shown in FIG. 1.

Figure 3:
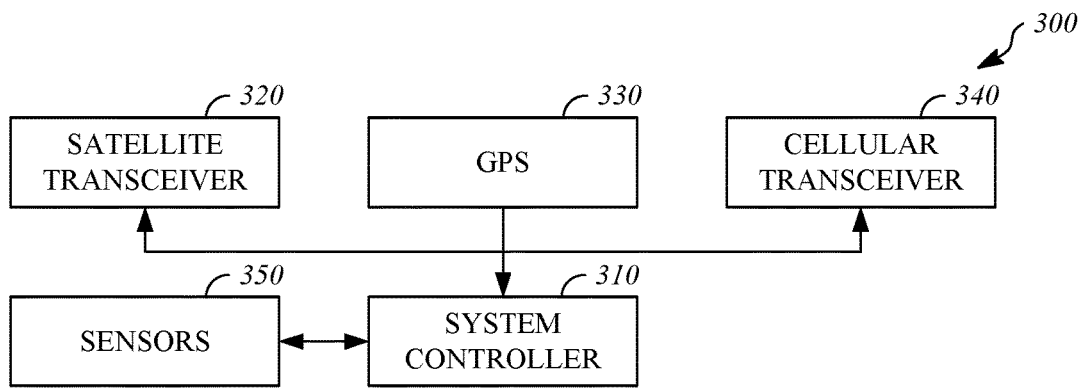
FIG. 3 is a block diagram showing an example of a telematics system.

FIG. 3 shows a telematics system 300. The telematics system 300 may be physically located on and associated with a particular mobile asset, such as a vehicle. As an example, the components of the telematics system 300 may be disposed within one or more housings that are installed within a vehicle. In the illustrated example, the telematics system 300 includes a system controller 310, a satellite transceiver 320, a satellite positioning system receiver such as a GPS receiver 330, a cellular transceiver 340, and one or more sensors 350.

As an example, the system controller 310 may be a computing device having a memory and a processor that is operable to execute instructions that are stored in the memory. The system controller 310 is operable to receive information from the other components of the telematics system 300. The system controller 310 is also able to control or cause operation of other components of the telematics system 300, such as causing transmission of information using the satellite transceiver 320 or the cellular transceiver 340.

The GPS receiver 330 is operable to output information that describes the physical location of the mobile asset that the telematics system 300 is installed in. When operating, the GPS receiver 330 receives timing signals from the GPS satellite constellation and calculates precise latitude, longitude and altitude values based on the timing signals. In this fashion, the precise physical position of the mobile asset is sensed and reported to the system controller 310. This information may be output by the GPS receiver 330 and transmitted to the system controller 310 continuously, such as by sending the information at regular intervals, or the information may be output by the GPS receiver 330 and transmitted to the system controller 310 in response to a request from the system controller 310. The system controller 310 may cause this information to be transmitted to a remote location to provide an asset manager, such as a fleet manager, with highly accurate real time information regarding the location of the asset. From this information it is possible to determine not only the instantaneous position of the asset but also determine if the asset is stationary or in motion. If the asset is in motion, the velocity and direction of travel may also be determined. This information is continuously reported to and computed by the system controller 310.

Transmission of information to a remote location allows the information to be utilized for fleet management purposes in real time. Thus, the remote location may be a monitoring facility where a fleet manager is located. In some implementations, transmission of the information takes place over conventional wide area networks, such as the cellular telephone system, using the cellular transceiver 340. In other implementations, transmission of the information is accomplished using transmissions made via one or more satellites in earth orbit through the use of the satellite transceiver 340. In implementations where real-time data transmission is not required, the system controller 310 may be provided with a local storage device, such as a magnetic storage media, a solid state storage media, or a printed form. These and other forms of local information storage allow the historic position and condition of the asset to be recorded and recovered at a later time to provide a record of the historical position, movement and condition of the asset.

The telematics system 300 may include one or more sensors 350. The sensors 350 may be any manner of device operable to output a signal or data in a form that can be understood by the system controller 310. The sensors 350 may be incorporated in the asset in which the telematics system 300 is installed. For example in an implementation where the telematics system 300 is installed in a motor vehicle that is powered by an internal combustion engine, the sensors 350 may include transducers or other devices for measuring operating characteristics and diagnostic information such as oil pressure, oil temperature, oil volume, coolant pressure, coolant temperature, fuel levels, engine speed, charging system status, and fault codes generated by an ECU of the vehicle.

The computer program instructions that are executed by the system controller 310 may integrate location data and other data for wireless transmission at temporal intervals to a remote location such as a central monitoring station, using a communications device such as the satellite transceiver 320 or the cellular transceiver 340. The information reported to the remote location allows the exact location and condition of the mobile asset to be determined in real time. Thus, the telematics system 300 promotes operational efficiency and makes remote management of mobile equipment possible.

Figure 4:
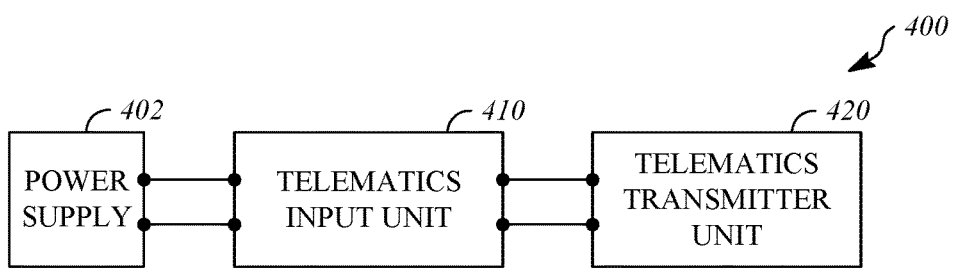
FIG. 4 is a block diagram showing connection of a telematics input unit and a telematics transmitter unit according to a first example.

FIG. 4 is a block diagram showing a telematics system 400 that includes a telematics input unit 410 and a telematics transmitter unit 420 according to a first example.

The telematics input unit 410 is typically physically positioned very close to a power supply 402 contained within the mobile asset. The power supply 402 may be, as examples, derived from a vehicle battery or a generator/alternator, available through a suitable receptacle on the vehicle or mobile asset. For example, the telematics input unit 410 may be positioned within one foot of the power supply 402. The telematics input unit 410 may be in the form of a housing that contains certain telematics system components. With reference to the telematics system 300, the system controller 310 may be located in the telematics input unit 410, while the remaining components are located elsewhere and are connected to the system controller to allow transmission of signals and/or data.

The telematics transmitter unit 420 is positioned at a location that is remote from the telematics input unit. As an example, the telematics transmitter unit 420 may be positioned at a location that is on the exterior of the mobile asset to allow proper functioning of communications equipment. The telematics transmitter unit 420 may be in the form of a housing that contains certain telematics system components. The telematics transmitter unit 420 may include the GPS receiver 330 and one or more communications devices that allow long range communication with a monitoring station, such as the satellite transceiver 320 and the cellular transceiver 340.

The telematics input unit 410 and the telematics transmitter unit 420 are interconnected, with the telematics input unit 410 providing the necessary "safe" power to the telematics transmitter unit 420, such as by incorporating a power convertor that reduces the voltage and/or amperage of the electrical power supplied from the telematics input unit 410 to the telematics transmitter unit 420. Safe electrical power is defined herein as electrical power that does not risk inadvertent combustion in a hazardous environment, by limiting the voltage and current of the electrical power to appropriate values for the given hazardous environment, as described with respect to FIG. 1.

Since there is still the possibility that an unsafe voltage is unintentionally introduced into the system, intrinsically safe barrier elements are incorporated in the telematics input unit 410 in order to ensure that any electrical short along the wiring between the telematics input unit 410 and the telematics transmitter unit 420 will not cause unsafe arcing. As one example, the electrical barrier 210 may be incorporated in the telematics input unit 410 to condition the power from the power supply 402 of the mobile asset in order to provide safe power to the telematics transmitter unit. This arrangement guards against unsafe arcing occurring, even if an over-voltage condition exists in the mobile asset, or an electrical short circuit occurs in the wiring between the telematics input unit 410 and the telematics transmitter unit 420, or there is an unintended introduction of external high voltages into the wiring between the telematics input unit 410 and telematics transmitter unit 420.

Figure 5:
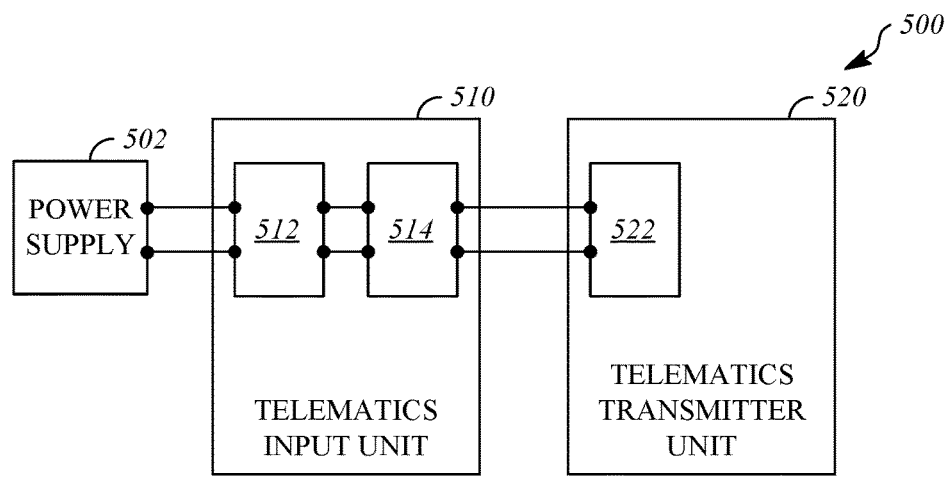
FIG. 5 is a block diagram showing connection of a telematics input unit and a telematics transmitter unit according to a second example.
Figure 6:
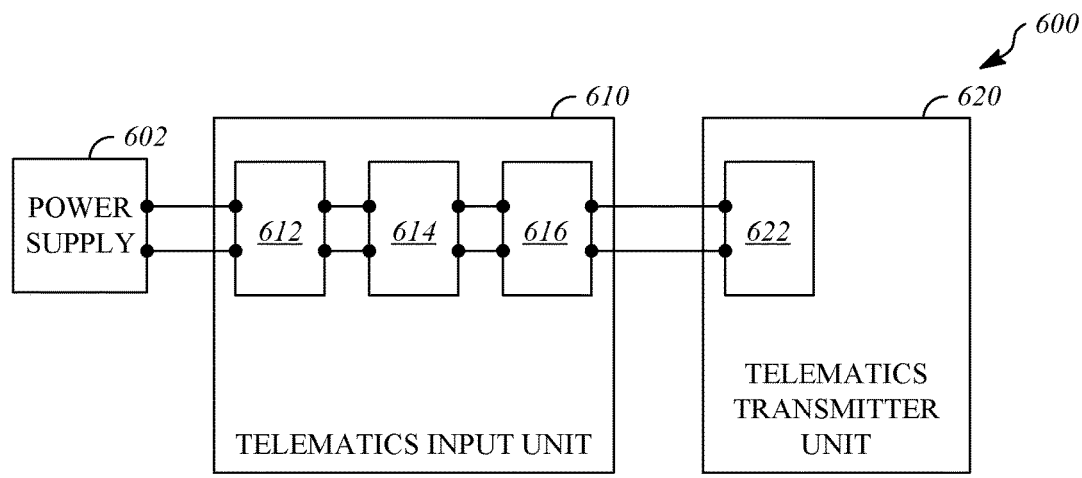
FIG. 6 is a block diagram showing connection of a telematics input unit and a telematics transmitter unit according to a third example.

As another example, as shown in FIG. 5, a telematics system 500 includes a telematics input unit 510 and a telematics transmitter unit 520. The telematics input unit 510 receives electrical power from a power supply 502 of the mobile asset and includes an electrical barrier 512 and diode protection 514. The diode protection 514 may be or include reverse diode protection. The telematics transmitter unit 520 also includes an electrical barrier 522, which serves as a secondary barrier against unsafe voltages/current. The electrical barrier 512 and the electrical barrier 522 may be configured as described with respect to the electrical barrier 210. The telematics system 500 is otherwise similar to the telematics system 400.

As seen in FIG. 1, the amount of current that can be safely supplied increases exponentially if voltage is reduced. To take advantage of this relationship, a voltage regulator may be included in the telematics input unit of a telematics system. Thus, as shown in FIG. 5, a telematics system 600 includes a telematics input unit 610 and a telematics transmitter unit 620. The telematics input unit 610 includes an electrical barrier 612 that receives electrical power from a power supply 602 of the mobile asset, a voltage regulator 614, and diode protection 616. The telematics transmitter unit 620 also includes an electrical barrier 622, by which electrical power is received from the telematics input unit 610. The electrical barrier 612 and the electrical barrier 622 may be configured as described with respect to the electrical barrier 210. The telematics system 600 is otherwise similar to the telematics system 400.

While the electrical barrier 210 performs well and is simple, inexpensive and reliable, there are conditions under which a more advanced regulation scheme for current and/or voltage may be needed. These conditions result from a desire to have less bulky components or from a desire to minimize electrical losses. Additionally, under certain circumstances, the input power to the telematics input unit 410 as provided by the mobile asset may be insufficient to power the telematics transmitter unit 420. Further, mobile assets often sit idle for long periods of time and during this time, the telematics input unit 410 and the telematics transmitter unit 420 need to be powered by the storage batteries contained within the mobile asset. Using circuits incorporating Zener diodes, such as the electrical barrier 210, in these circumstances may result of current drain on these batteries.

Figure 7:
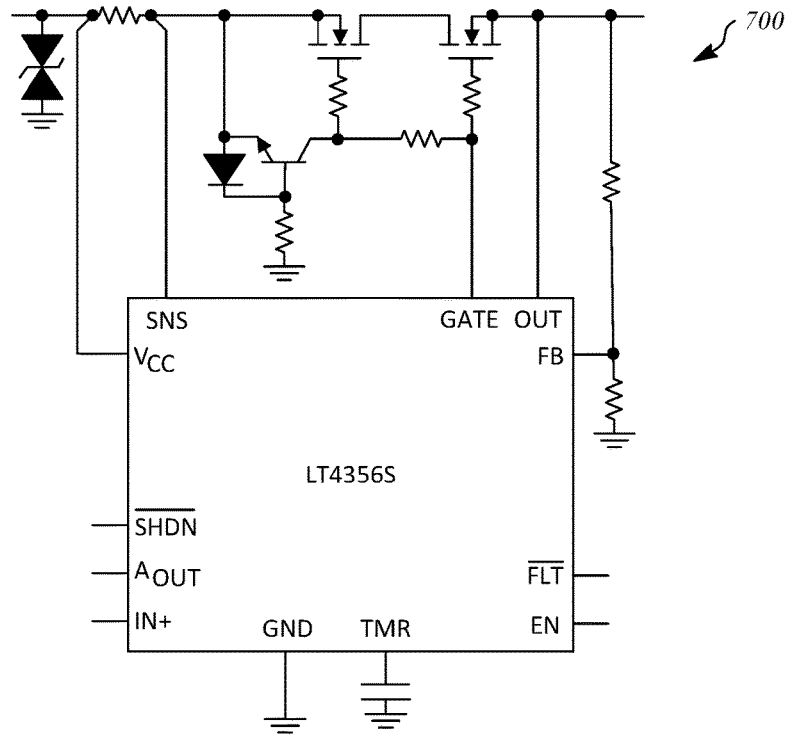
FIG. 7 is a block diagram showing an example of an electrical barrier circuit according to a second example.
Figure 8:
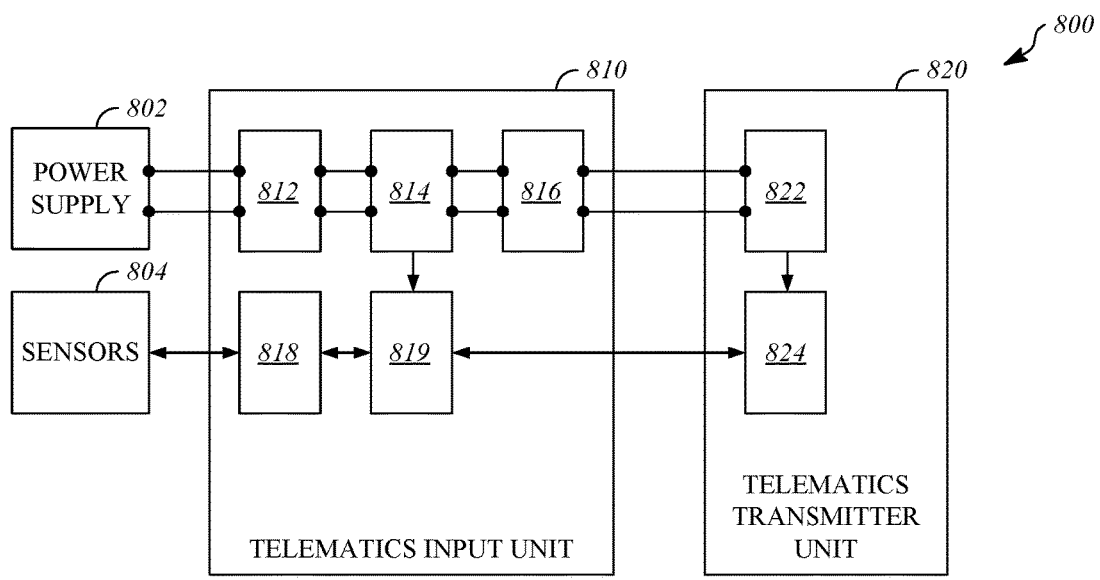
FIG. 8 is a block diagram showing connection of a telematics input unit and a telematics transmitter unit according to a fourth example.

Accordingly, in some implementations, a surge suppressor 700, as shown in FIG. 7, is utilized as an electrical barrier instead of the electrical barrier 210.

In the illustrated example, the surge suppressor 700 includes a surge suppressor integrated circuit 710. For example, the surge suppressor integrated circuit 710 may be similar to Linear Technology part no. LT4356. The surge suppressor 700 is connected between the power source of the mobile asset and the telematics transmitter unit 420. The surge suppressor integrated circuit 710 regulates the output power that is provided to the telematics transmitter unit 420 by controlling the gates of a pair of MOSFET. The surge suppressor 700 reduces resistive losses and leakage currents, while still providing the necessary limits on voltage and current passing through the system. The surge suppressor integrated circuit 710 causes the output to be limited to the safe value, thereby allowing the loads to continue functioning. The surge suppressor integrated circuit 710 circuit also monitors the voltage drop between the VCC and SNS pins to protect against over-current faults. An internal amplifier limits the current sense voltage to 50 mV. In either fault condition, a timer is started inversely proportional to MOSFET stress. If the timer expires, the FLT pin pulls low to warn an impending power down. If the condition persists, the MOSFET is turned off until the shutdown pin pulls low momentarily. Additional implementations of surge suppressors utilizing components such as Linear Technology part no. LT4356 are possible and are well-known among persons of ordinary skill in the art.

In another implementation, telematics system 800 includes a telematics input unit 810 and a telematics transmitter unit 820. In this implementation, the telematics input unit 810 is able to receive and cause transmission of information from sensors 804, and the telematics transmitter unit 820 reports this information in addition to reporting on the location of the mobile asset. The information from the sensors 804 can be used to report on the state of various other parameters of the mobile asset such as (a) state of ignition; (b) battery voltage; (c) fuel levels; (d) engine fault codes; (e) engine temperatures and pressures. Modern telematics systems can take input from a variety of analog and digital sensors and report this data along with the location and movement of the asset. However, since the sensors 804 for these parameters are positioned in a variety of locations within the mobile asset, these elements may require long wire runs to the telematics input unit 810, and between the telematics input unit 810 and the telematics transmitter unit 820.

The telematics input unit 810 includes an electrical barrier 812 that receives electrical power from the power source of the mobile asset, a voltage regulator 814, and diode protection 816. The telematics input unit 810 also includes an input/output processor 819, which may be powered by a power supply 802 of the mobile asset through the electrical barrier 812 and the voltage regulator 814. All inputs and outputs from the sensors 804 are connected to the input/output processor 819 by an electrical barrier 818. In this fashion, all of the wiring for the sensors 804 terminates at the telematics input unit 810 which may be located close to the source of the sensors 804. Software contained in the input/output processor 819 within the telematics input unit 810 constantly monitors the inputs from the sensors 804 and creates and transmits data packets which may be either broadcast or otherwise sent on demand to the telematics transmitter unit 820, where it is received by a communications controller 824. This allows information from the sensors 804 to be transmitted by a single communications connection instead of the multiple communications lines and interfaces that may extend from the sensors 804 to the telematics input unit 810. Thus, the telematics transmitter unit 820 communicates digitally with the input/output processor in the telematics input unit 810 so that minimal electrical wiring exists between the two units. The data transmission from the input/output processor 819 to the communications controller 824 may be a wired connection or a wireless connection, using digital communications technology. The physical layer of this communication scheme may employ simple copper wire, fiber optics cables, or utilize various short-range RF/wireless schemes. For wired connections that transmit information to the communications controller 824, an electrical barrier such as the electrical barrier 210 may be provided. In the alternative, if sensor data is conveyed along optical fibers with suitable means to convert the signals to electrical signals at both the input and output, an electrical barrier is not required for the signal connection. Likewise, by using of short range, low power radio frequency means such as RF transmissions using a suitable protocol such as Bluetooth low energy, an electrical barrier is likewise not needed for the signal connection.

The telematics transmitter unit 820 may include an electrical barrier 822, by which electrical power is received from the telematics input unit 810. The electrical barrier 812 and the electrical barrier 822 may be configured as described with respect to the electrical barrier 210. The telematics system 800 is otherwise similar to the telematics system 400.

Figure 9:
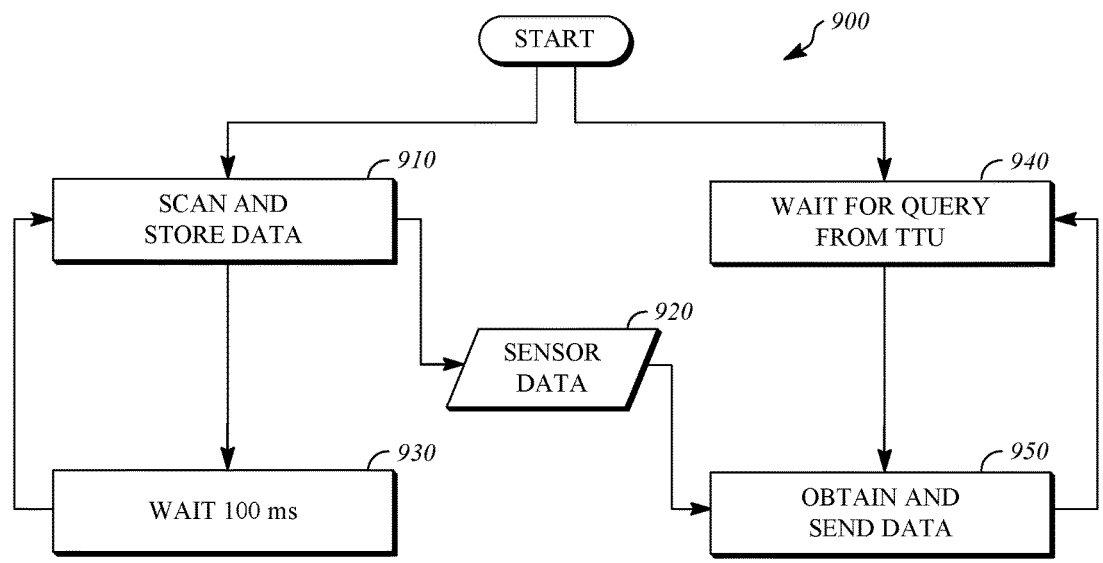
FIG. 9 is a flowchart showing a data sending operation of a telematics input unit.

FIG. 9 is a flowchart showing a data scanning and storing process 900. The process 900 may be performed, for example, by the input/output process 819 of the telematics system 800. In operation 910 information is scanned from sensors and stored as sensor data 920, such as in memory at a processor of the telematics transmitter unit. In operation 930, a delay such as 100 ms passes before returning to operation 910 to update the sensor data 920. In a parallel operation, the telematics input unit waits for a query from the telematics transmitter unit at operation 940. Upon receiving a query, the sensor data 920 is transmitted to the telematics transmitter unit.

Figure 10:
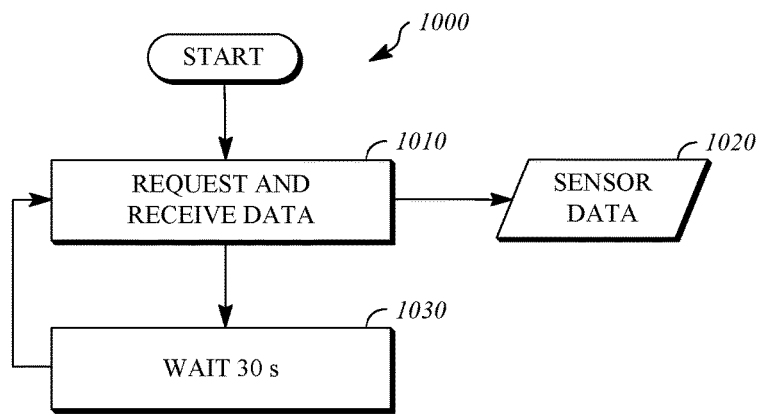
FIG. 10 is a flowchart showing a data receiving operation of a telematics transmit unit.

FIG. 10 is a flowchart showing a data receiving process 1000. The process 1000 may be performed, for example, by the communications controller 824 of the telematics transmitter unit 820 of the telematics system 800. In operation 1010, the telematics transmitter unit 820 requests data from the telematics transmitter unit. Upon receiving a response from the telematics input unit, sensor data 1020 is processed for transmission over the satellite or cellular networks along with position information for the mobile asset. The process advances to operation 1030 where a delay such as 30 seconds passes before the process returns to operation 1010. In addition to performing the data receiving process 1000, the communications controller 824 or other component of the telematics transmitter unit 820 is responsible for encoding and transmission of all of the sensor data along with GPS position data at periodic intervals to a remote location by cellular or satellite transmission using well-known algorithms and techniques.

While the system described herein is configured principally for intrinsic safety requirements, the system is equally suitable in environments where intrinsic safety is not an issue. Avoiding the harmful effects of unintended arcing or excessive voltages or currents is always a desirable goal, even if the target user does not explicitly require formal intrinsic safety rating.

An examination of the permissible voltages and currents provided in FIG. 1 clearly shows that as open circuit voltage is increased, the permissible currents, reduce significantly. Voltages available from commercial construction equipment vary over a wide range (12V to 48 V, typically). If the telematics input unit is designed with such a wide operating input voltage, with passive current restriction element (such as a resistor), the net impact of this is to reduce the overall permissible power that can be safely delivered if the unit is operated at the low voltage end. Cellular and satellite transmitters require several hundred mill amperes of current typically, with peak current requirements in the range of 1-2 amperes.

Figure 11:
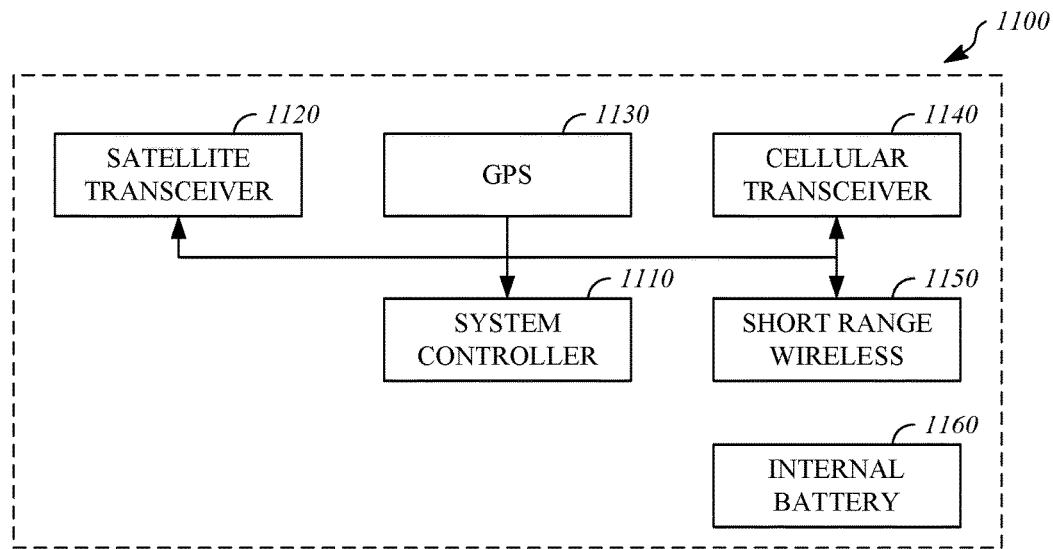
FIG. 11 is a block diagram showing a telematics system according to an alternative implementation.

FIG. 11 shows a telematics system 1100 that avoids that current level constraints at higher voltages that would prevent powering cellular or satellite transmitters. The telematics system 1100 in the illustrated example includes system controller 1110, a satellite transceiver 1120, a satellite positioning system receiver such as a GPS receiver 1130, a cellular transceiver 1140, short range wireless communications system 1150, and one more internal batteries 1160 for powering some or all of the components of the telematics system 1100. The wireless communications system 1150 may be a low power short-range wireless transmitter such as a BLE (Bluetooth Low Energy) unit. The telematics system 1100 may also receive sensor input from the mobile asset as previously described.

Figure 12:
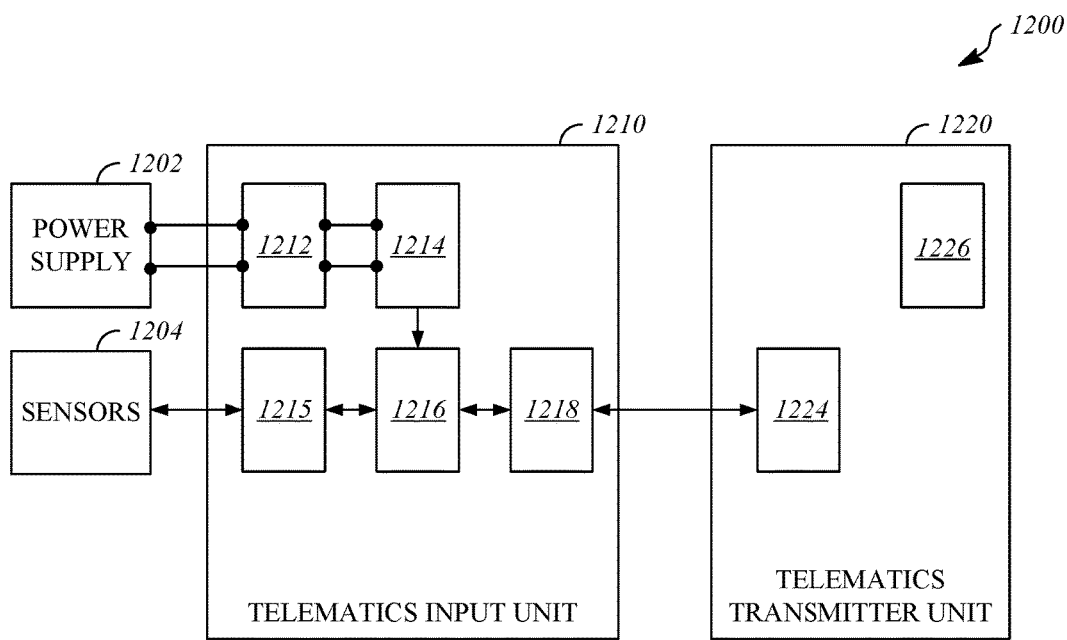
FIG. 12 is a block diagram showing connection of a telematics input unit and a telematics transmitter unit according to a fifth example.

FIG. 12 shows a telematics system 1200, which is an implementation of the concepts described with respect to the telematics system 1100. The telematics system 1200 includes a telematics input unit 1210 and a telematics transmitter unit 1220. In this implementation, the telematics input unit 1210 is able to receive and cause transmission of information from sensors 1204, and the telematics transmitter unit 1220 reports this information to a remote location in addition to reporting on the location of the mobile asset. The telematics input unit 1210 includes an electrical barrier 1212 that receives electrical power from a power source 1202 of the mobile asset and a voltage regulator 1214. The telematics input unit 1210 also includes an input/output processor 1216, which may be powered by the power supply 1202 of the mobile asset through the electrical barrier 1212 and the voltage regulator 1214. All inputs and outputs from the sensors 1204 are connected to the input/output processor 1216 by an electrical barrier 1215.

The telematics input unit 1210 does not supply power to the telematics transmitter unit. As a result, the power requirements on the telematics input unit are quite low and it can be designed to operate well within the power/voltage/current constraints of the spark ignition curves provided in FIG. 1, over a very wide input voltage range. The telematics transmitter unit 1220 incorporates an ultra-low power design, with built in long-life batteries 1226 within the housing on the telematics transmitter unit 1220, in a sealed, typically waterproof enclosure. The telematics transmitter unit 1220 further incorporates communications controller 1224, which may be a short-range wireless transceiver that is paired with a similar short-range wireless transceiver 1218 that is disposed in the telematics input unit 1210.

The telematics transmitter unit 1220 may be configured and operated in a manner that allows a life span of 5 plus years before the long-life batteries 1226 are depleted. As an example, the long-life batteries 1226 may be non-rechargeable lithium batteries. For example, the telematics transmitter device 1220 may be maintained in a state of sleep with high-power subsystems such as cellular and satellite transceivers powered off, while maintaining minimum functionality that allows the telematics transmitter unit 1220 to wake up at predetermined intervals. In this state, the telematics transmitter device 1220 consumes a small amount of power, such as under 50 microamperes.

At a first time interval, such as 1-5 minutes, the telematics transmitter unit 1220 may power up the communications controller 1224 to allow short range wireless communication using a protocol such as BLE (Bluetooth Low Energy). The telematics transmitter unit 1220 interrogates the telematics input unit 1210 for sensor data, which is stored at the telematics transmitter device 1220. This data exchange takes only a few milliseconds typically and consumes a very small amount of battery capacity. In this manner, the telematics transmitter unit 1220 accumulates the necessary sensor information, such as equipment operating hours, fuel consumed, fault codes, etc. At a second predetermined interval, such as once per hour or once per day, the telematics transmitter device 1220 powers on the GPS receiver to obtain a location fix, powers down the GPS receiver and then powers up the cellular transceiver or satellite transceiver and transmits the stored location and sensor information to a remote monitoring location. The operation may take, for example, 30-60 seconds. Thus, the telematics system 1200 spends the majority of its time in an ultra-low power consumption mode, preserving battery power. Since the telematics transmitter unit 1220 does not draw any power from the equipment on which it is mounted, it is completely electrically isolated from any voltage surges, shorts, etc. that may happen on the equipment.

Although the description herein is made with reference to particular implementations, it should be understood that numerous alternative implementations are available, as will be apparent to persons of ordinary skill in the art.

The invention claimed is:

1. A telematics system, comprising:
   a telematics input unit that has a first housing;
   an electrical barrier circuit located in the telematics input unit, wherein the telematics input unit is connectable to a power supply through the electrical barrier circuit, the electrical barrier circuit receives electrical power from the power supply, the electrical barrier circuit conducts the electrical power to a ground when a voltage value of the electrical power is greater than a predetermined voltage value, and the electrical barrier circuit provides safe electrical power to the telematics input unit;
   a telematics transmitter unit that has a second housing and is remote from the telematics input unit, wherein the telematics transmitter unit receives the safe electrical power from the telematics input unit; and
   a long range communications device disposed within the telematics transmitter unit.

2. The telematics system of claim 1, wherein the telematics transmitter unit has a secondary electrical barrier circuit that is located in the second housing to protect the telematics transmitter unit against unsafe voltages/current.

3. The telematics system of claim 1, wherein the telematics input unit has reverse diode protection against unsafe voltages entering via the connection between itself and said telematics transmitter unit.

4. The telematics system of claim 1, wherein the telematics input unit has a voltage regulator incorporated so that only a safe low voltage is sent to said telematics transmitter unit.

5. The telematics system of claim 1, wherein the telematics input unit has an input/output processor that receives sensor information from a plurality of sensors, and the input/output processor transmits the sensor information to the telematics transmitter unit using a single communications interface.

6. The telematics system of claim 5, wherein the single communications interface is an optical communications interface.

7. The telematics system of claim 5, wherein the single communications interface is a short range wireless communications interface.

8. A telematics system, comprising:
   a telematics input unit that has a first housing;
   an electrical barrier circuit located in the telematics input unit;
   a telematics transmitter unit that has a second housing and is remote from the telematics input unit;
   a short range wireless communications system that allows transmission of information between the telematics input unit and the telematics transmitter unit; and
   a long range communications device disposed within the telematics transmitter unit,
   wherein the telematics transmitter unit includes a battery in the second housing for powering the long range communications device,
   wherein the telematics input unit and the telematics transmitter unit are not electrically connected, wherein the telematics transmitter unit is free from wired external electrical power connections, wherein the telematics transmitter unit is free from wired external signal connections, and wherein the telematics input unit has an input/output processor that receives sensor information from a plurality of sensors, and the input/output processor transmits the sensor information to the telematics transmitter unit using the short range communications system.

9. A telematics system for a mobile asset having a power source, comprising:

one or more sensors for measuring operating characteristics of the mobile asset and providing a sensor output signal;

a telematics input unit having:
   a first housing,
   a first electrical barrier circuit that is disposed in the first housing and receives electrical power from the power source of the mobile asset, wherein the electrical barrier circuit conducts the electrical power to a ground when a voltage value of the electrical power is greater than a first predetermined voltage value, and the first electrical barrier circuit outputs the electrical power when the voltage value of the electrical power is less than the first predetermined voltage value,
   a voltage regulator that is disposed in the first housing and receives the electrical power from the first electrical barrier circuit that regulates the voltage value of the electrical power,
   a second electrical barrier circuit that is disposed in the first housing and receives the electrical power from the voltage regulator and receives the sensor output signal from the one or more sensors, wherein the second electrical barrier circuit conducts the sensor output signal to a ground when a voltage value of the sensor output signal is greater than a second predetermined voltage value, and the second electrical barrier circuit outputs the sensor output signal when the voltage value of the sensor output signal is less than the second predetermined voltage value,
   an input/output processor that is disposed in the first housing that receives the sensor output signal from the second electrical barrier and stores sensor information, and
   a short range wireless communications device that receives the sensor output signal and broadcasts the sensor output signal; and a telematics transmitter unit having:
   a second housing,
   a communications controller that receives the sensor information from the short range wireless communications device,
   a satellite positioning receiver that is disposed in the second housing and outputs position information,
   a long range communications device that is disposed in the second housing and transmits the sensor information and the position information, and
   a battery that is disposed in the second housing and supplies power to the long range communications device, the satellite positioning receiver, and the communications controller.

10. The telematics system of claim 9, wherein the telematics transmitter unit powers on the short range communications device to receive the sensor information and powers off the short range communications device for a first time interval after receipt of the sensor information, and the telematics transmitter unit powers on the long range communications device to transmit the sensor information and the position information and powers off the long range communications device for a second time interval after transmission of the sensor information and the position information, and the second time interval is longer than the first time interval.

* * * * *